A

United States Patent

Nakamura

[11] Patent Number: 5,831,635
[45] Date of Patent: Nov. 3, 1998

[54] IMAGE PROCESSING DEVICE

[75] Inventor: Masashi Nakamura, Kawasaki, Japan

[73] Assignee: Ricoh Company, Ltd., Tokyo, Japan

[21] Appl. No.: 736,605

[22] Filed: Oct. 25, 1996

[30] Foreign Application Priority Data

Oct. 25, 1995 [JP] Japan .................................. 7-278058

[51] Int. Cl.$^6$ ............................. G06T 11/20; H04N 1/393
[52] U.S. Cl. ........................... 345/443; 358/452; 358/453
[58] Field of Search .................................. 358/452, 453; 382/266, 267, 268, 269, 309, 310, 311, 177, 282; 345/133, 135, 441, 443

[56] References Cited

U.S. PATENT DOCUMENTS

| | | | |
|---|---|---|---|
| 5,095,520 | 3/1992 | Kim ........................................ | 395/101 |
| 5,369,741 | 11/1994 | Hartog et al. ............................. | 345/443 |
| 5,502,801 | 3/1996 | Takayanagi et al. .................... | 345/443 |

*Primary Examiner*—Kim Yen Vu
*Assistant Examiner*—Vikkram Bali
*Attorney, Agent, or Firm*—Oblon, Spivak, McClelland, Maier & Neustadt, P.C.

[57] ABSTRACT

In an image forming apparatus, an image processing device draws, when a start point, at least one bent point, an end point and a width of a bold line is input, the bold line by generating a plurality of rectangular areas based on a line connecting the start point and bent point, a line connecting the bent point and the end point, and the input width. Each rectangular area or box is generated such that the start and end points of a line lie at the center in the widthwise direction of the box, and such that the bent point lies at a corner of the box on the basis of the direction of rotation of the above line and a line contiguous therewith. The bent point therefore does not lie at the center of the box in the widthwise direction. When an area signal is generated based on the stored start and end points of each box in the main scanning direction, a blank is obviated despite that a bent point area is additionally generated.

6 Claims, 22 Drawing Sheets

END POINT

FIG. 29C  AREA SIGNAL

FIG.30A
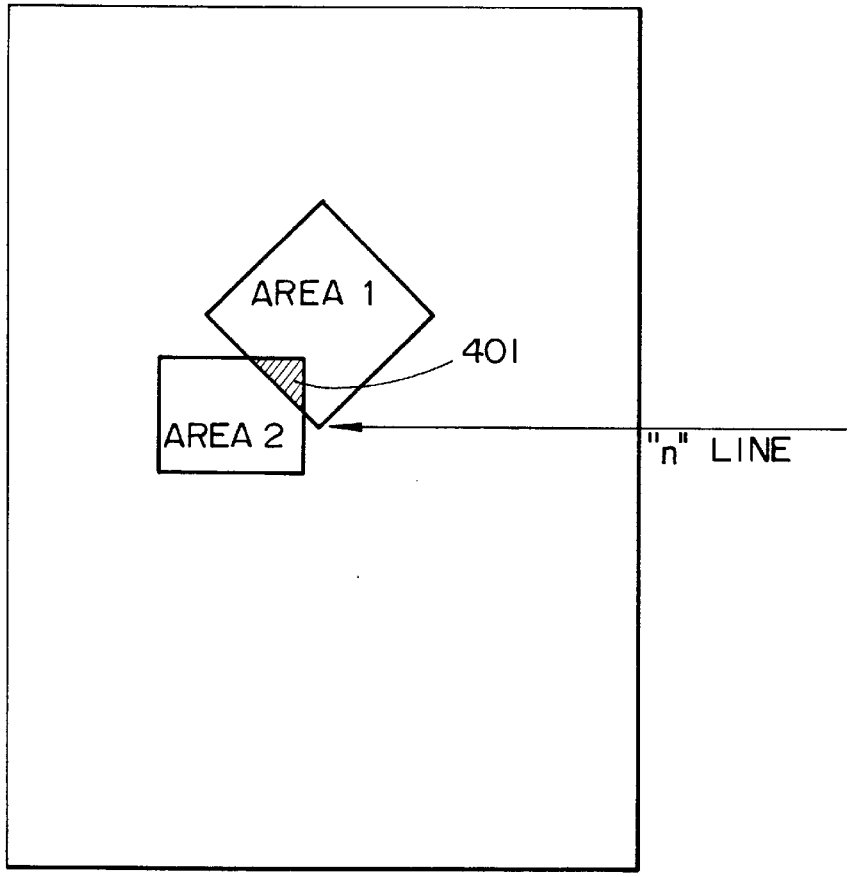
FIG.30B
BIT MAP MEMORY
| | | | | | | | | |
|---|---|---|---|---|---|---|---|---|
| "n-4" LINE | 2 | | 1 | | 2 | | | 1 |
| "n-3" LINE | 2 | | 1 | | 2 | | | 1 |
| "n-2" LINE | 2 | | | 1 | 2 | | 1 | |
| "n-1" LINE | | | | | 1 | | 1 | |
| "n" LINE | | | | | 1 | 1 | | |
FIG.30C
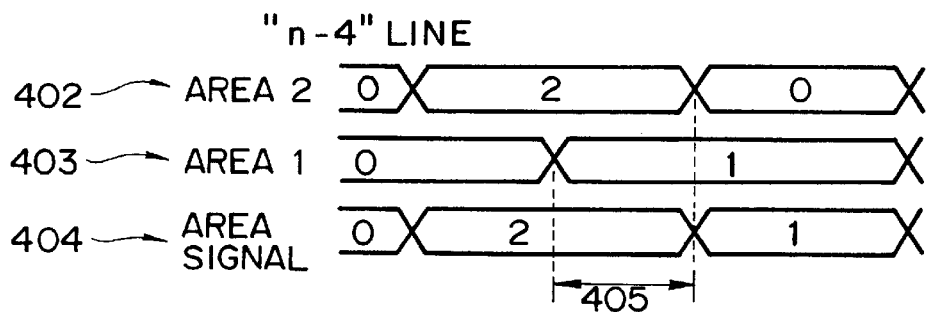

FIG. 31A
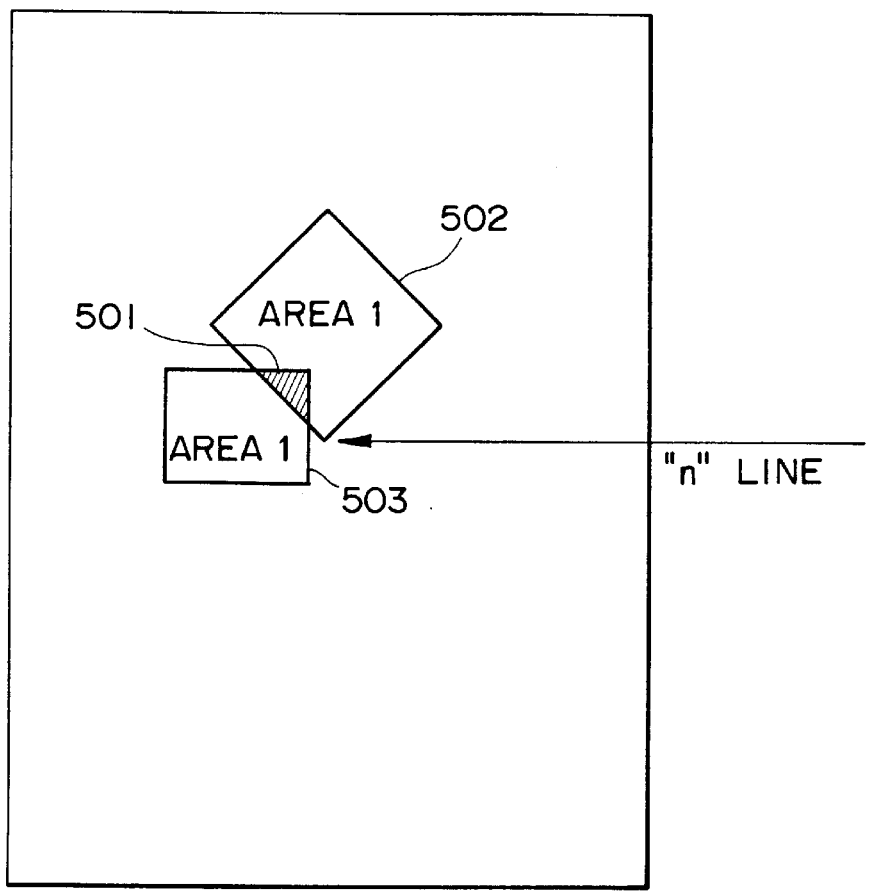
FIG. 31B
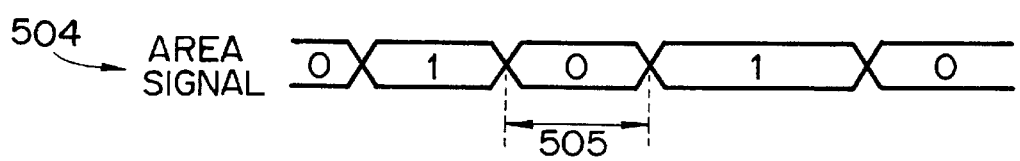
FIG. 31C

IMAGE PROCESSING DEVICE

BACKGROUND OF THE INVENTION

The present invention relates to an image processing device for a digital copier or similar image forming apparatus.

More particularly, the present invention is concerned with an image processing device for drawing, when a start point, at least one bent point, an end point and a width of a bold line are input, the bold line by generating a plurality of rectangular areas based on a line connecting the start point and the bent point, a line connecting the bent point and the end point, and the input width.

It is a common practice with a digital copier or similar image forming apparatus to allow the operator to mark a desired area of a document on a coordinate input section. In response, an area signal distinguishing the inside and the outside of the marked area is generated. The image lying in the marked area is processed in various manners on the basis of the area signal. The problem with the conventional apparatus is that, e.g., a bold line including two portions making an acute angle therebetween cannot be drawn attractively.

SUMMARY OF THE INVENTION

It is therefore an object of the present invention to provide an image processing device capable of drawing an attractive bold line even when it includes two portions making an acute angle therebetween.

In accordance with the present invention, in an image processing device for drawing, when a start point, at least one bent point, an end point and a width of a bold line are input, the bold line by generating a plurality of rectangular areas based on a line connecting the start point and the bent point, a line connecting the bent point and the end point, and the width, means is provided for generating the plurality of rectangular areas such that in each of the rectangular areas the start and end points lie at a center in a widthwise direction of the rectangular area while the bend point lies at a corner on the basis of a direction of rotation of contiguous lines.

Also, in accordance with the present invention, in an image processing device of the type described, a position generating section generates an area for rendering the bent point smooth, and then generates start points and end points, in a main scanning direction, of a single area including the above area and rectangular areas contiguous with it. A storage stores the start points and end points. An area signal generating section generates an area signal which is active between the start points and the end points stored in the storage. The bold line is drawn while the area signal is active.

Further, in accordance with the present invention, in an image processing device including a reading section for photoelectrically reading an image of a document, and a display for displaying the image read by the reading section, and for outputting the image after subjecting the image to preselected processing, a first inputting section inputs a start point, a bent point and an end point of a bold line to be drawn in the image as positions of the bold line. A first storage stores information representative of the positions of the start point, bent point, and end point. A second inputting section inputs information representative of the boldness of the line. A second storage stores the boldness of the line. A computing section computes, based on the information stored in the first and second storages, an area containing lines having boldness and connecting the start point, bent point and end point input on the first inputting section. An image processing section processes the image lying in the above areas.

BRIEF DESCRIPTION OF THE DRAWINGS

The above and other objects, features and advantages of the present invention will more apparent from the following detailed description taken with the accompanying drawings in which:

FIGS. 29A–29C shows area signals to appear when a single area is marked;

FIGS. 30A–30C show area signals to appear when two areas are marked, and each should be processed in a particular manner;

FIGS. 31A–31C show area signals to appear when two areas are marked and should be subjected to identical processing;

DESCRIPTION OF THE PREFERRED EMBODIMENT

Figure 29A:
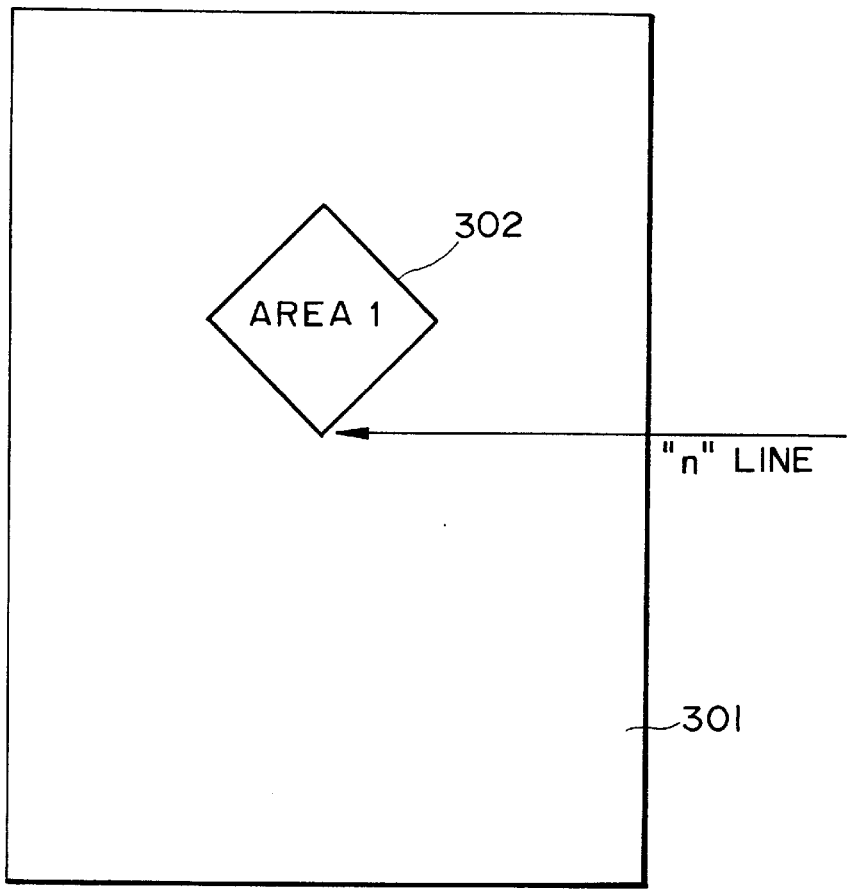

To better understand the present invention, a brief reference will be made to a conventional image processing device. Generally, a digital copier or similar image forming apparatus allows the operator to mark any desired area of a document on a coordinate input section included in the apparatus. FIG. 29A shows a specific document 301 whose area 302 is marked by the operator. The apparatus generates an area signal dividing the inside and the outside of the marked area 302. For this purpose, use is made of a bit map memory in which one or more bits are assigned to a single dot of a document. The capacity of the bit map memory increases with an increase in the amount of information of the area; several bits must be assigned to a single dot of a document. For example, if the area has sixteen information, then four bits must be assigned to a single dot.

Figure 29B:
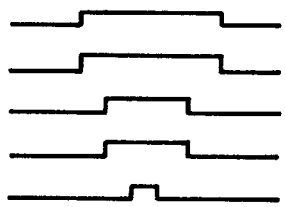

FIG. 29B shows a specific conventional method of writing area information in the bit map memory. As shown, data 303 representative of the start and end points of an area in the main scanning direction are written to the memory. As shown in FIG. 29C, signals becoming active between the start and end points are generated by hardware processing. Specifically, assume that the data of the area having information "1" are written to the memory. Then, as shown in FIG. 29B, "1" is written to the memory at the start and end points. When these data are read out, they turn out line-by-line area signals each going high at the start point and going low at the end point, as shown in FIG. 29C. This allows the inside of the marked area to be painted or otherwise processed.

As shown in FIG. 30A, assume that two marked areas 1 and 2 overlap each other (region 401), and that each of the areas 1 and 2 should be processed in a particular manner. For example, assume that the area 1 should be painted while the area 2 should be inverted. Then, as shown in FIG. 30B, data indicative of the contents of processing are written to the memory between the start points and the end points of the individual area. As for the "n-4" line, for example, as shown in FIG. 30C, area signals 402 and 403 respectively representative of the areas 2 and 1 appear. When priority is given to the processing of the area 2 in the overlapping region 401, an area signal 404 associated with the area 2 appears over a period 405 corresponding to the region 401.

As shown in FIG. 31A, assume that two marked areas 502 and 503 overlap each other over a region 501 and should be subjected to the same kind of processing. Then, as shown in FIG. 31B, data written to the memory cannot be distinguished from each other. As a result, as shown in FIG. 31C, an area signal 504 does not go high over a period 505 corresponding to the overlapping region 501, preventing the region 501 from being processed in the desired manner.

Figure 32:
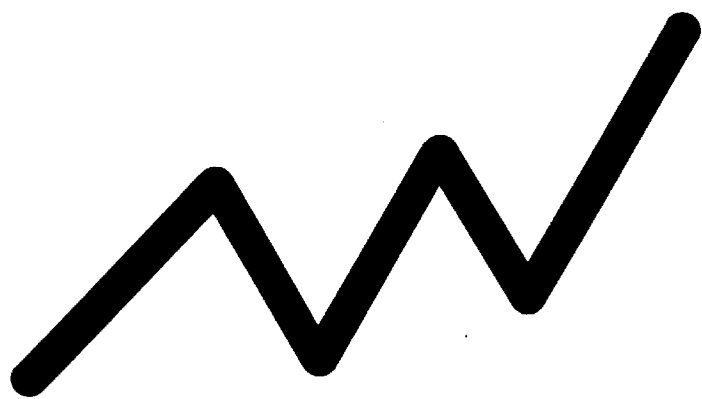
FIG. 32 shows another specific bold line.
Figure 33:
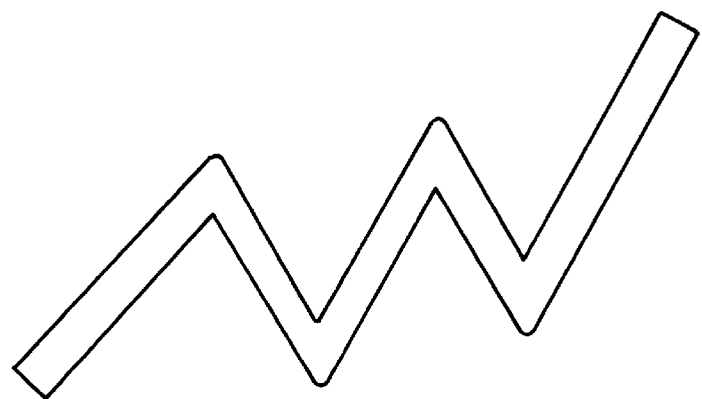
FIG. 33 shows the contour of the bold line of FIG. 32.
Figure 34:
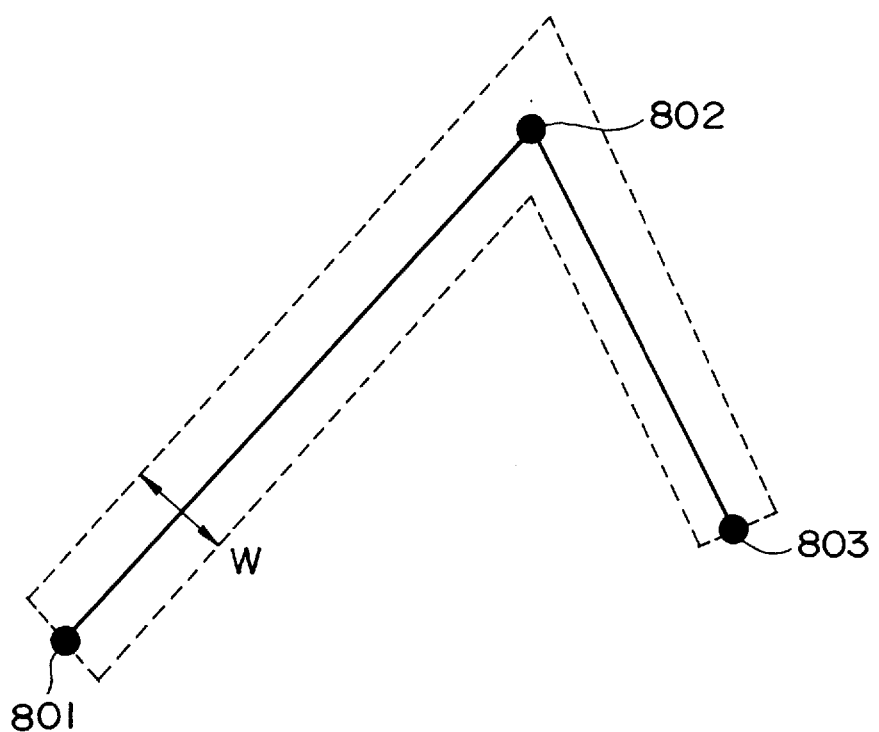
FIG. 34 shows specific designated coordinates and a contour.
Figure 35A:
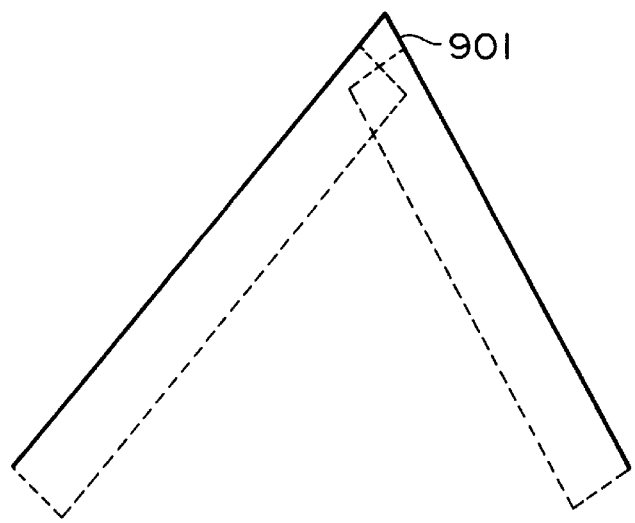
FIGS. 35A–35C specific methods of smoothing a bent portion.
Figure 35B:
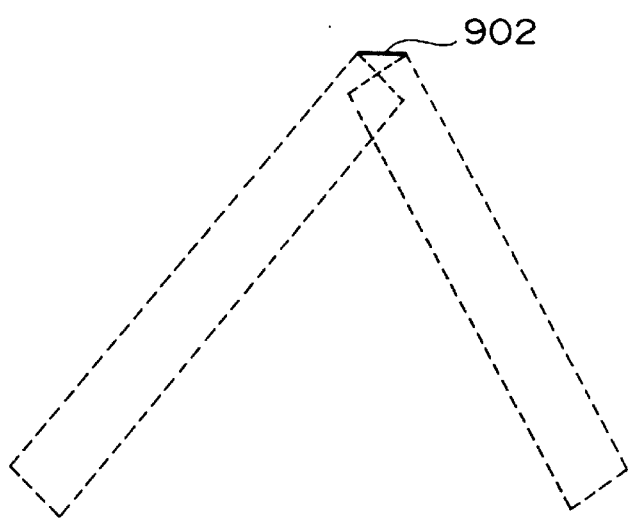
Figure 35C:
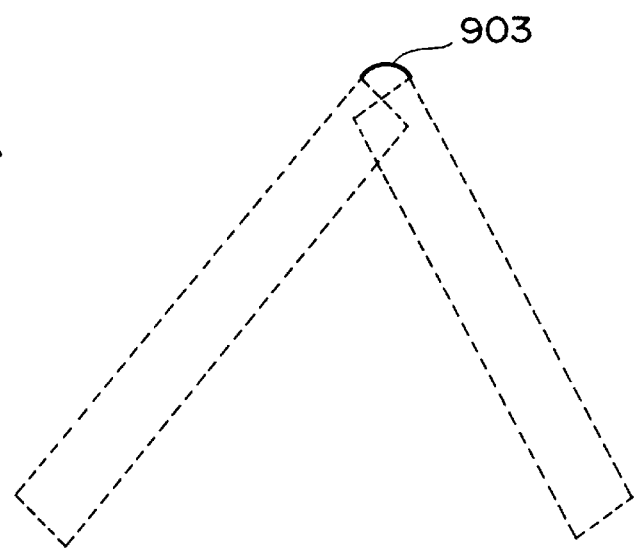

How the device capable of generating an area signal draws a bold line will be described hereinafter. FIG. 32 shows a specific bold zigzag line having five strokes. As shown in FIG. 33, the device recognizes the contour of each stroke as an area and paints the inside of the area to thereby draw a bold line. As shown in FIG. 34, a start point 801, a bent point 802 and an end point 803 included in contiguous two strokes are input together with the width W of the line. Then, to allow the portion around the bent point 802 to appear smooth, the device sharpens it (labeled 901 in FIG. 35A), cuts it flat (labeled 902 in FIG. 35B), or rounds it (labeled 903 in FIG. 35C).

Figure 36:
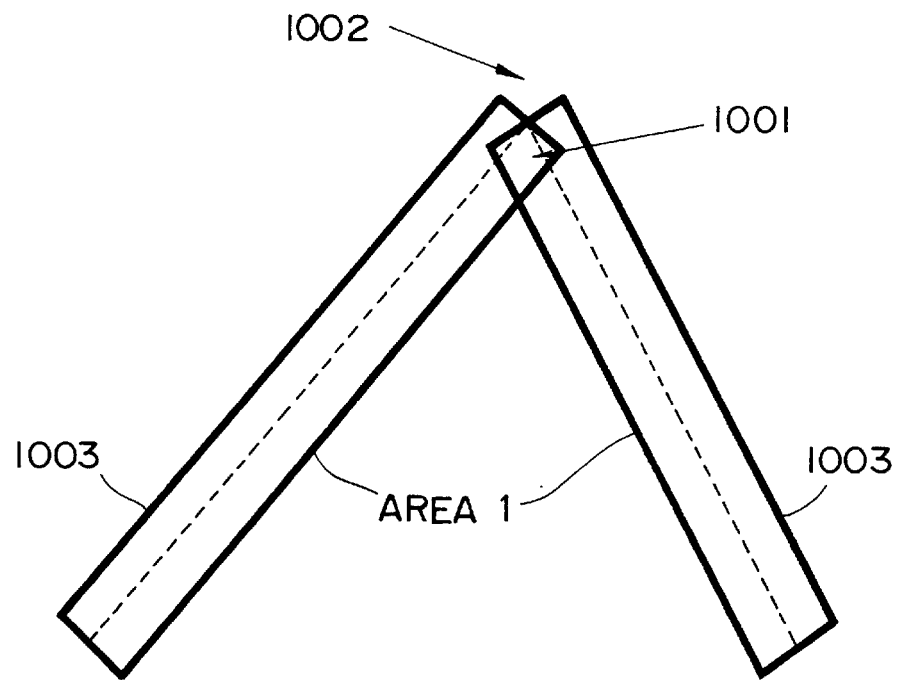
FIG. 36 shows a specific bent portion.
Figure 37:
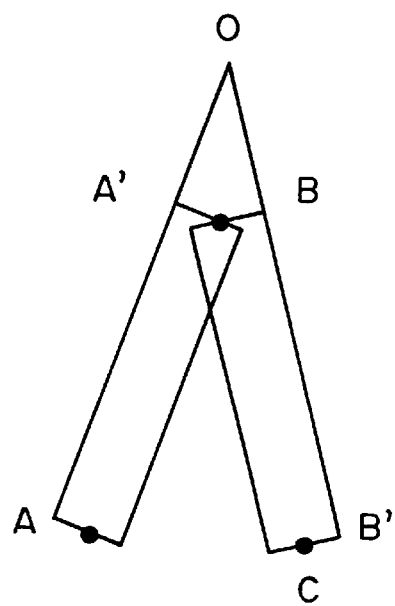
FIG. 37 shows the angle of a conventional bent portion.

FIG. 36 demonstrates a procedure for sharpening the portion around the bent point 802. As shown in FIG. 36, when two lines connecting the designated three points are connected together by two rectangular areas or boxes, an overlapping region 1001 occurs between the two boxes. This region 1001 remains blank because the area signal does not appear, as stated earlier. To solve this problem, the region 1001 may be painted in a circle by simply determining a point where the extensions of the two lines intersect or by computation. This kind of scheme is taught in, e.g., Japanese Patent Publication No. 61-8434 or Japanese Patent Laid-Open Publication No. 6-168339. Further, as shown in FIG. 37, a recess 1002 existing above the blank portion may be sharpened by determining a point where the outer lines or sides 1003 of the two boxes intersect each other. However, as shown in FIG. 37, assume that two lines A-A1 and B-B' make an acute angle therebetween. Then, a point O where the outer lines of the two boxes intersect is far from the designated points A' and B, rendering the resulting image unnatural.

Moreover, assume that an extra region containing a bent portion is generated in order to render the bent portion smooth. Then, a blank occurs when an area signal is generated on the basis of stored positions representative of the start and end points of the individual area in the main scanning direction.

Figure 1:
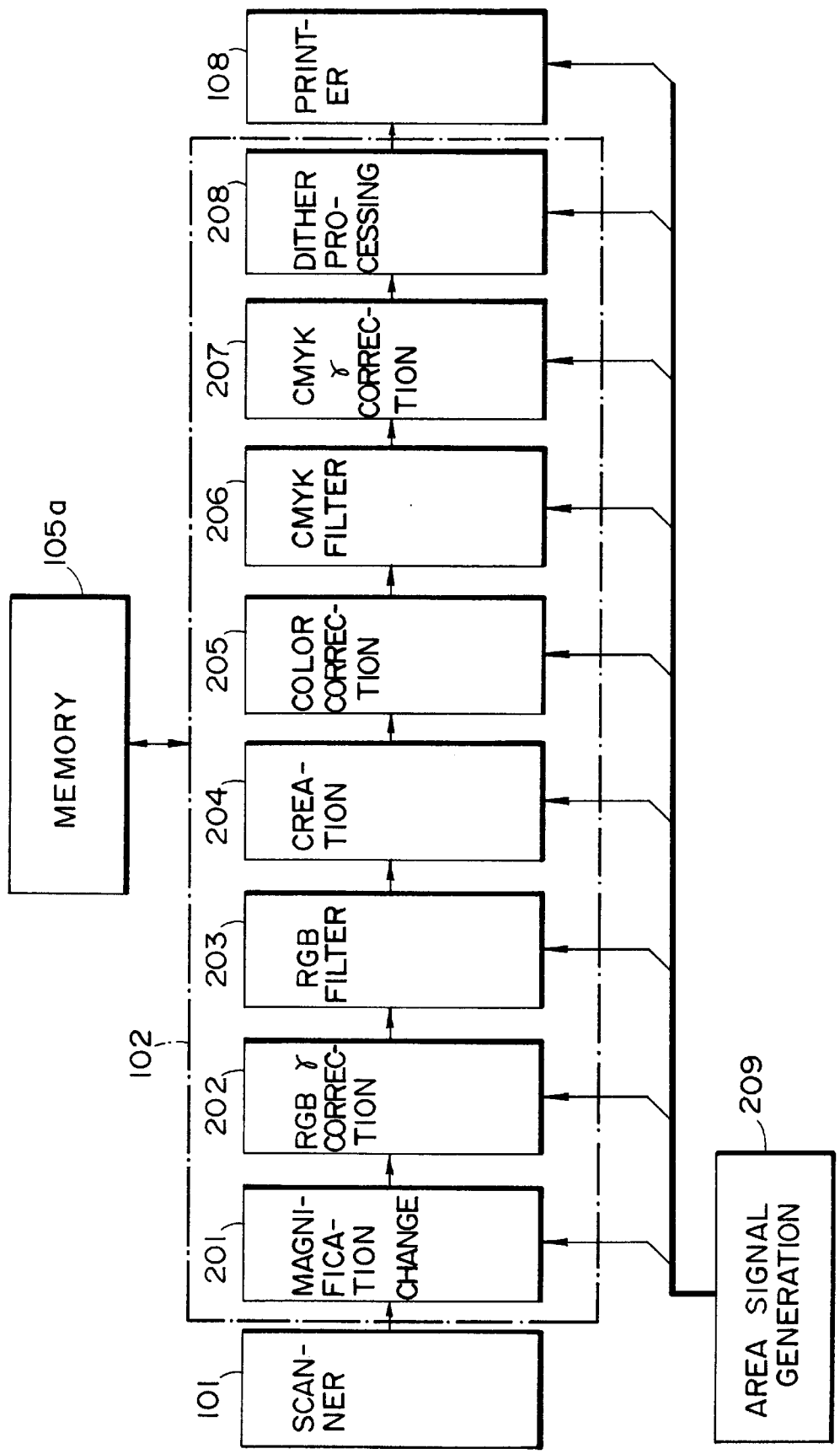
FIG. 1 is a block diagram schematically showing an image processing device embodying the present invention.
Figure 2:
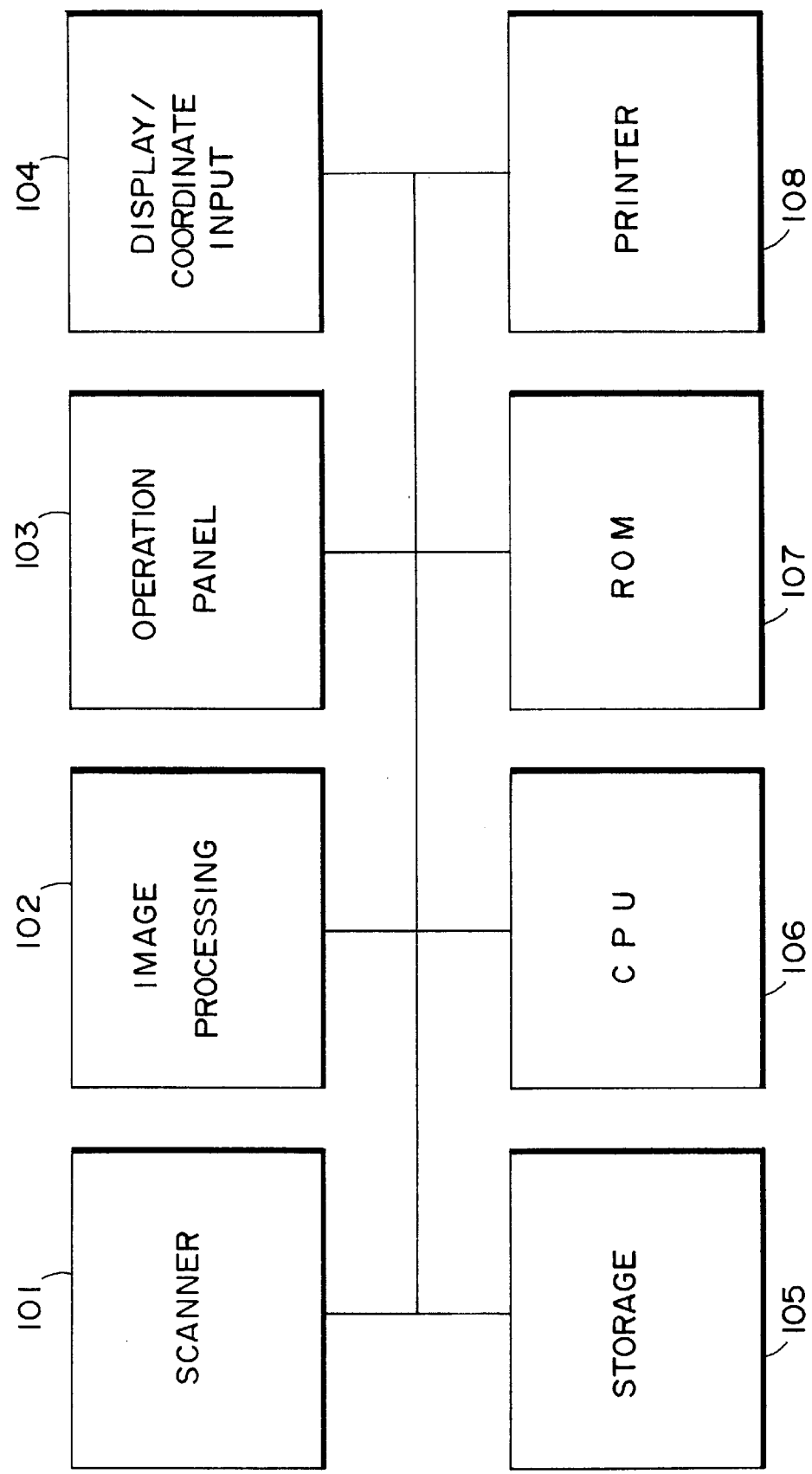
FIG. 2 is a block diagram schematically showing a digital copier including the embodiment.

Referring to FIG. 2, a digital copier including an image processing device embodying the present invention will be described. As shown, the copier includes a scanner 101 for reading image data out of a color document and generating corresponding digital image data. An image processing section 102 executes various kinds of image processing, including editing, with the digital image data. An operation panel 103 allows the operator to input a desired procedure to be executed by the image processing section 102. A tablet or similar display/coordinate input section 104 displays the result of processing and allows the operator to mark a desired area in terms of coordinates. A storage 105 temporarily stores the image data to be processed by the image processing section 102. A CPU (Central Processing Unit) 106 controls the entire copier. A ROM (Read Only Memory) 107 stores parameters, control procedures and so forth necessary for the CPU 106 to execute control. A printer 108 prints out the processed data on a recording medium. The storage 105 includes an image data memory 105a (see FIG. 1) and a read/write circuit, not shown.

As shown in FIG. 1, the image processing section 102 processes R (red), G (green) and B (blue) image signals output from the scanner 101 while feeding Y (yellow), M (magenta), C (cyan) and K (black) signals to the printer 108.

Specifically, the section 102 includes a magnification change 201 for changing the magnification of the R, G and B signals in the main scanning direction. An RGB γ correction 202 corrects the gray balance of R, G and B output from the magnification change 201 as well as the γ transform characteristic of the scanner 101. An RGB filter 203 executes MTF (Modulation Transfer Function) correction (sharpening) with the R, G and B signals output from the RGB γ correction 202, thereby correcting blur ascribable to optics built in the scanner 101. A creation 204 allows the R, G and B signals output from the RGB filter 203 to be edited in any desired mode, e.g., mirror mode, italic mode, shadow mode, outline mode, paint mode, move mode, or bold mode.

A color correction 205 transforms, by use of a primary masking system, the R, G and B signals output from the creation 204 to Y, M, C and K signals. A CMYK filter 206 corrects the Y, M, C and K signals in accordance with the MTF characteristic of the printer 108. A CMYK γ correction 207 corrects the Y, M, C and K signals output from the filter 206 in accordance with the γ characteristic of the printer 108. A dither processing 208 deals with the tonality of the Y, M, C and K signals output from the correction 207. The Y, M, C and K signals output from the dither processing 208 are sent to the printer 108.

Figure 11:
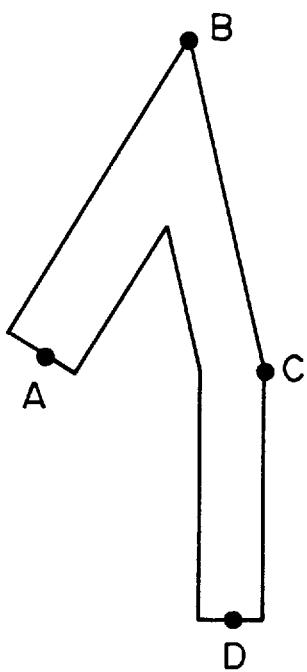
FIG. 11 shows a bold line derived from the relation of FIG. 8.
Figure 12:
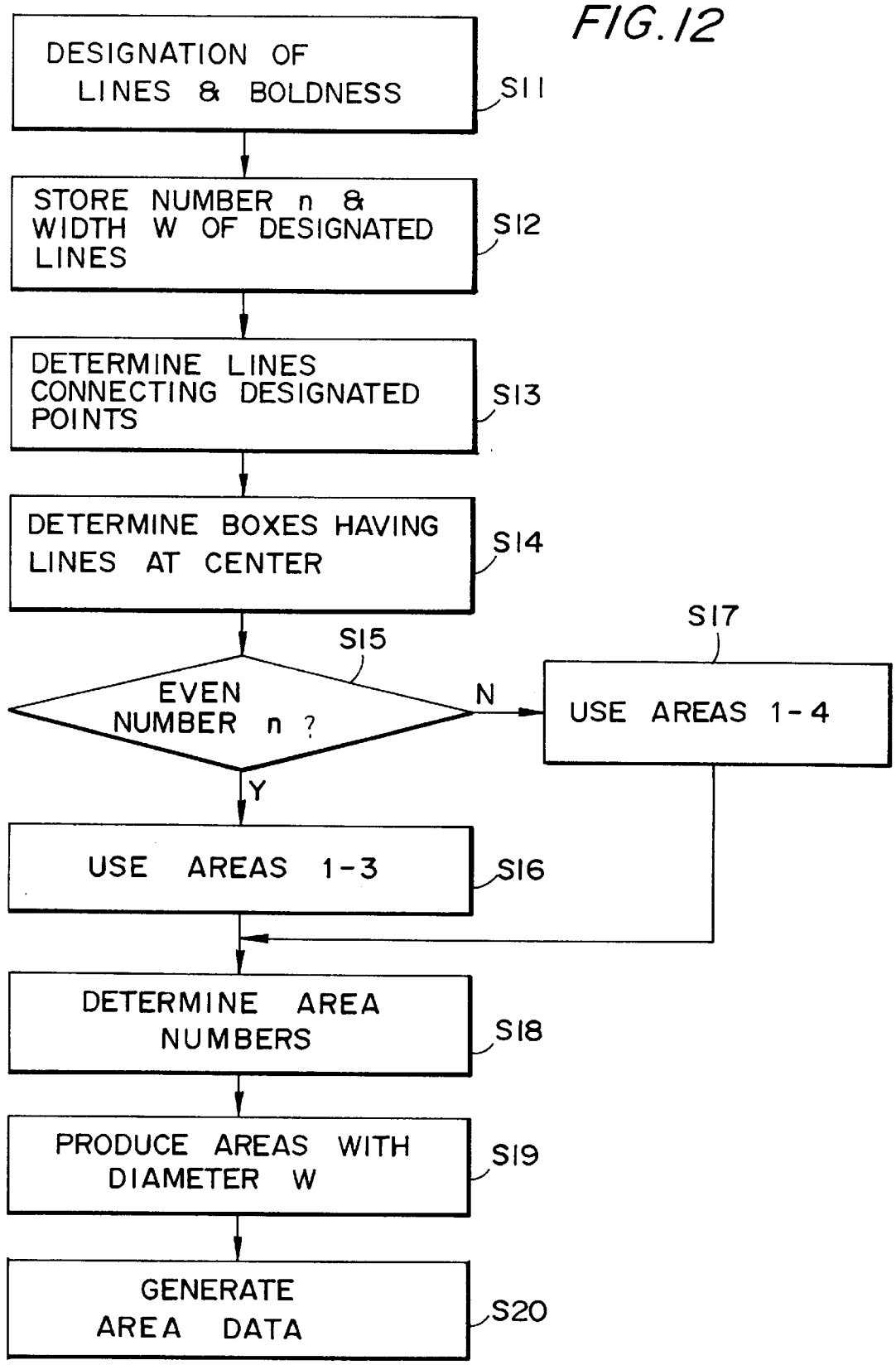
FIG. 12 is a flowchart representative of a procedure for rounding the bent portion of a bold line.

An area signal generation 209 generates an area signal representative of a marked area to be processed and feeds it to the various sections 201–208 shown in FIG. 11. Particularly, the creation 204 draws pixels while the area signal is active, thereby generating a bold line image.

Figure 3:
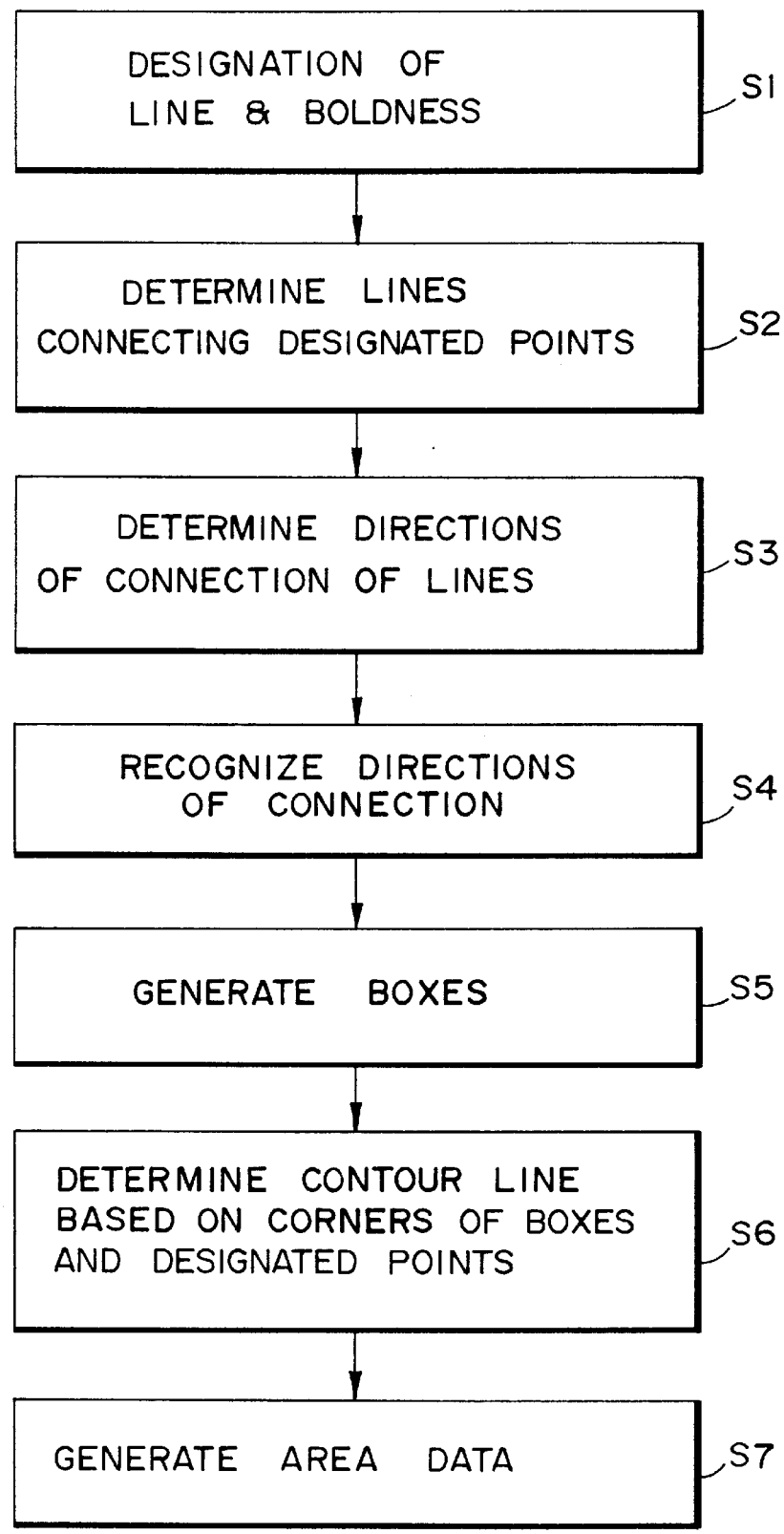
FIG. 3 is a flowchart demonstrating a procedure for sharpening the bent point of a bold line.
Figure 4:
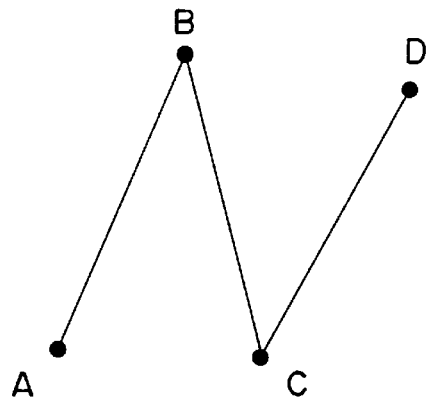
FIG. 4 shows specific designated coordinates of the bold line.
Figure 5:
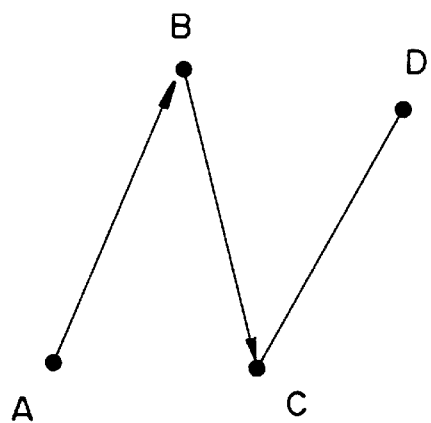
FIG. 5 shows directions in which the bold line is connected on the basis of the coordinates of FIG. 4.
Figure 6:
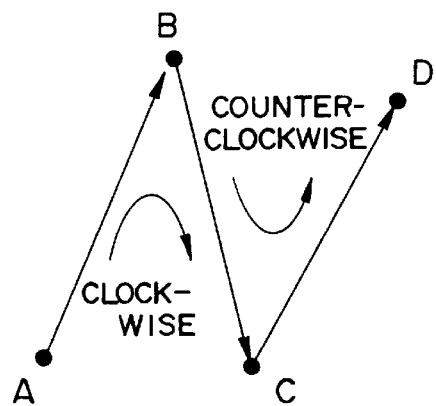
FIG. 6 shows directions of rotation based on the coordinates of FIG. 4.

A reference will be made to FIGS. 3–11 for describing a procedure for sharpening a portion where adjoining lines are connected. FIG. 4 shows a generally N-shaped line image specifically. As shown in FIG. 3, when a start point A, bent points B and C and an end point D included in "N" are designated together with the width of the line image, they are stored (step S1). As for the width, a plurality of lines each having a particular width may be displayed on the display 104, urging the operator to select one of them. Subsequently, designated points A, B, C and D are sequentially connected in the order of designation, so that lines A–B, B–C and C–D are produced (step S2). As shown in FIG. 5, directions in which the points A–D are connected, i.e., A→B, B→C and C→D are determined (step S3). Then, as shown in FIG. 6, the directions of bends at the points B and C, i.e., whether the lines adjoining each other at each of the points B and C rotate clockwise or they rotate counterclockwise is determined (step S4). In this specific image, the lines A–B and B–C rotate clockwise while the lines B–C and C–D rotate counterclockwise.

Figure 7:
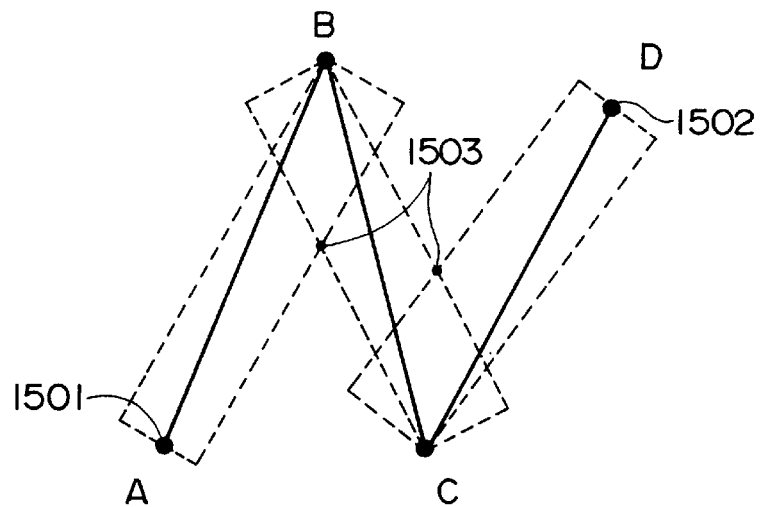
FIG. 7 shows a relation between the coordinates of FIG. 4 and rectangular areas.
Figure 8:
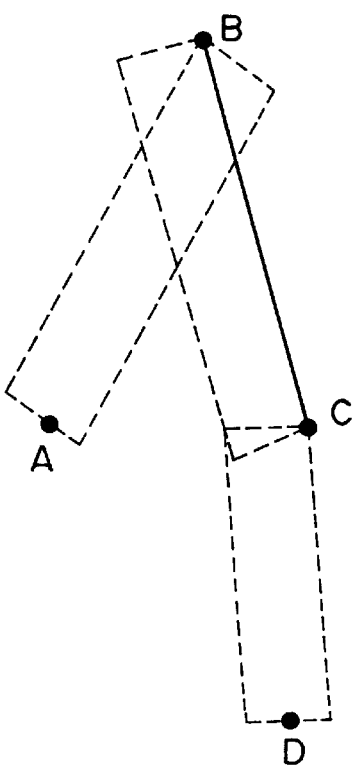
FIG. 8 shows a relation between other specific designated coordinates and rectangular areas.

As shown in FIG. 7, a rectangular area or box containing the line A→B is formed such that the start point A lies at the center 1501 of the start side of the box, and the bent point B lies at the outer corner of the end side. A rectangular box containing the line B→C is formed such that the bent points B and C both lie at the outer corners of the box which are diagonal to each other. Further, a rectangular box containing line C→D is formed such that the bent point C lies at the outer corner of the start side while the point D lies at the center 1502 of the end side. These steps are collectively represented by a step S5 in FIG. 3. As shown in FIG. 8, if the lines B–C and C–D rotate clockwise, then the box containing the line B–C will be formed such that the points B and C lie on, or define, the outer side of the box.

Figure 9:
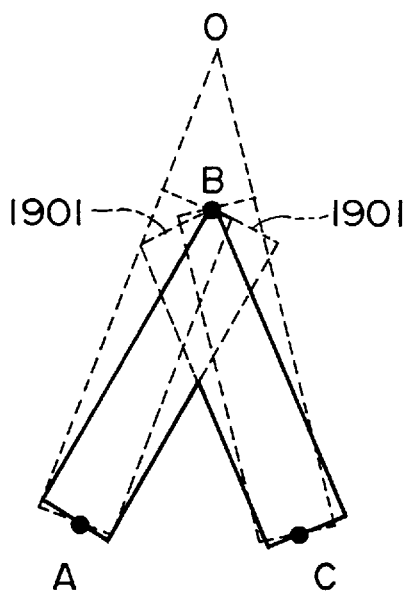
FIG. 9 compare the embodiment and the prior art with respect to the angle of a bent portion.
Figure 10:
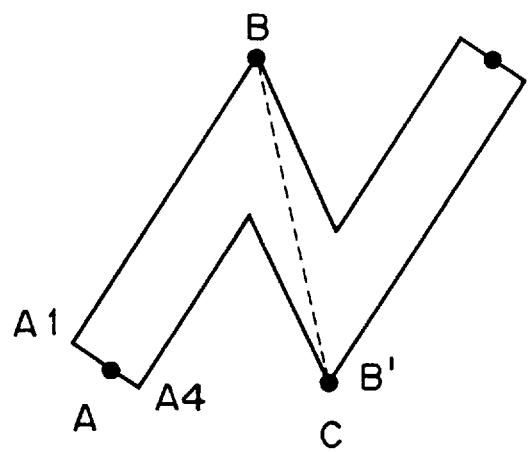
FIG. 10 shows a bold line derived from the relation of FIG. 7.

Next, contour lines are produced on the basis of the corners of the boxes and the designated points (step S6). Assume the box in which the points B and C are diagonal to each other. Then, points 1503 of the sides where the above box intersect the boxes respectively containing the lines A–B and C–D are determined so as to determine the overlapping regions. The start and end points of the areas are generated such that the start and end points of the area signal do not occur at the outside of the overlapping regions. The resulting data are written to a bit map memory as area data (step S7). Consequently, as shown in FIGS. 9–11, even when the lines A–B and B–C make an acute angle therebetween, the point of connection is coincident with the designated point B and frees the resulting image from jaggedness.

Figure 13:
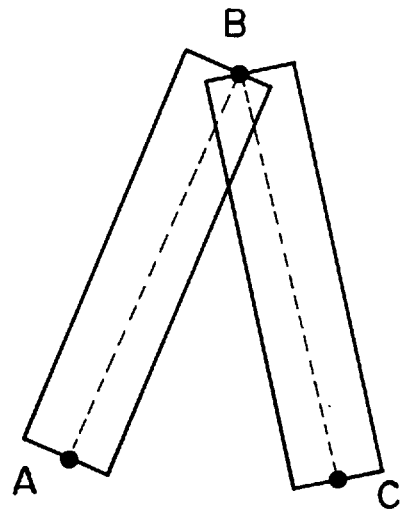
FIG. 13 shows specific designated coordinates of a bold line.

FIGS. 12–20 demonstrate a rounding procedure. In this case, a plurality of areas are dealt with by the same processing. FIG. 13 shows a specific line image in the form of an inverted "V". A shown in FIG. 12, the image "V" is designated by a start point A, a bent point B and an end point C as well as by a width W (step S11). In response, the points A, B and C, the number n of lines connecting them, and the width W are stored (step S12). Then, lines A–B and B–C are determined (step S13), as indicated by phantom lines in FIG. 13. Subsequently, two rectangular boxes having the lines A–B and B–C at their centers are produced (step S14).

Whether or not the number n of lines connecting the points A, B and C is even is determined (step S15). If the number n is even, three areas 1, 2 and 3 are used (step S16) while, if it is odd, four areas 1, 2, 3 and 4 are used (step S17).

Figure 14:
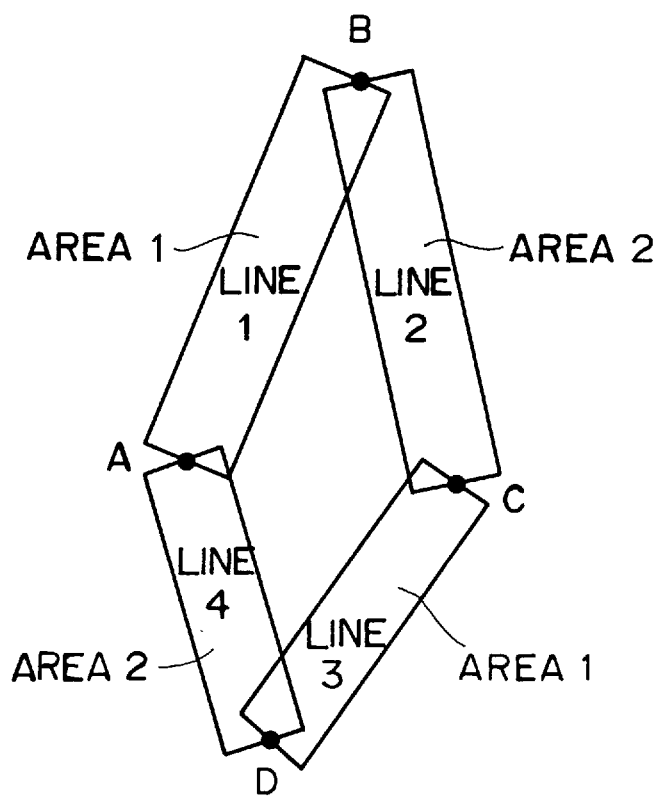
FIG. 14 shows rectangular areas to be generated when the number of designated lines is even.

First, assume that the number n is odd. FIG. 14 shows a specific line image in the form of a closed loop A–B–C–D whose number n is four. Then, there are assumed the area 1 as a first box for the line A–B, the area 2 as a second box for the line B–C, the area 1 as a third box for the line C–D, and the area 2 as a fourth box for the line D–A (step S18).

Figure 15:
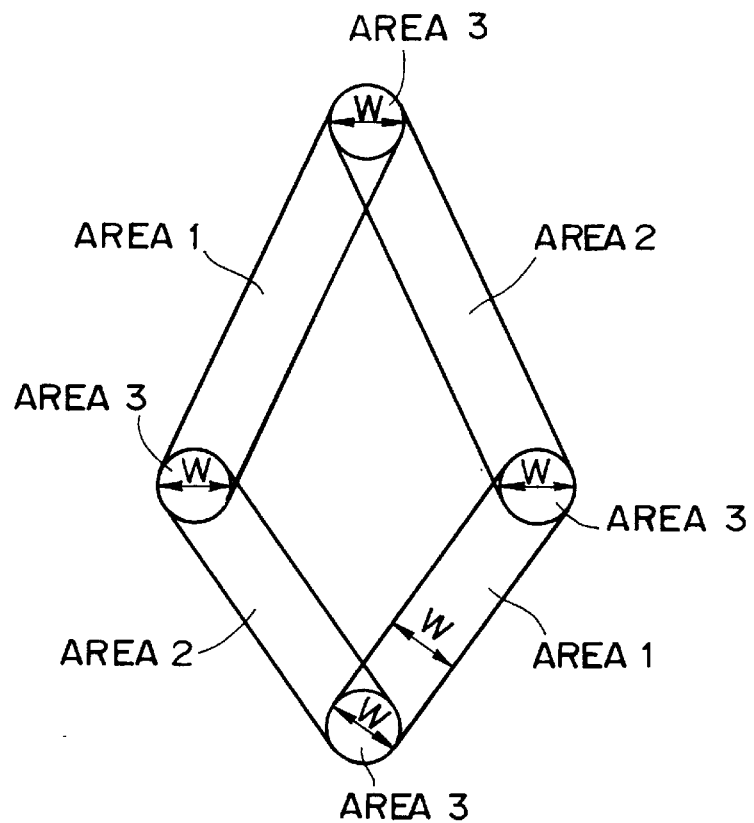
FIG. 15 shows how the bent portions of the image shown in FIG. 13 are rounded.
Figure 16:
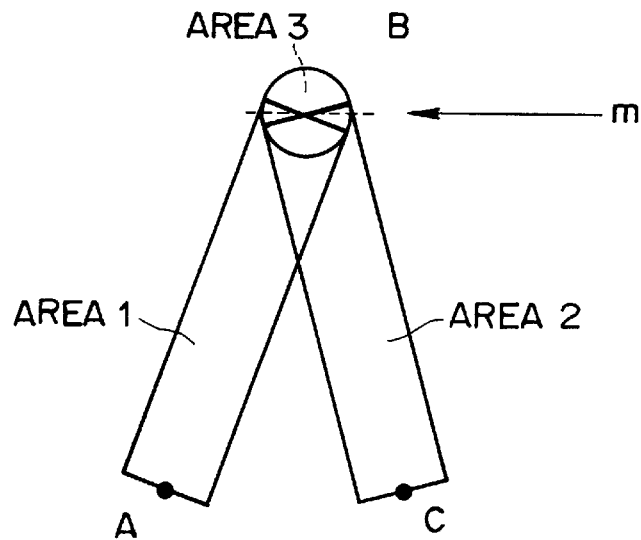
FIG. 16 shows how the bent portion of the image shown in FIG. 13 is rounded.
Figure 17:
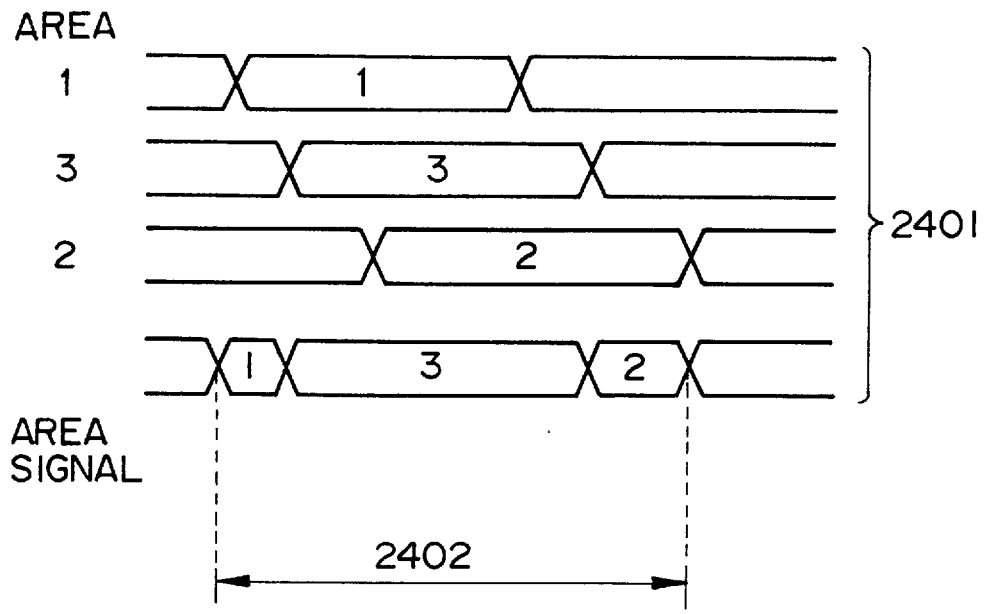
FIG. 17 is a timing chart showing area signals particular to the rounded portion of FIG. 16.

Subsequently, as shown in FIG. 15, a diameter w having one of the points A, B, C and D at its center and matching the width W of the boxes is determined. The resulting circular regions where the four boxes are connected are each determined to be the area 3. When the inverted "V" shown in FIG. 13 is designated, it consists of the areas 1, 2 and 3, as shown in FIG. 16. Therefore, as shown in FIG. 17, three different kinds of area signals 2401 appear for the "m" line of the image. An area signal 2402 indicative of the start and end points, in the main scanning direction, of a single area containing the areas of the signals 2401 is generated (step S20). By setting a condition for painting all the areas 1–3 of the area signal 2402, it is possible to pain the areas 1–3 in a single color.

Figure 18:
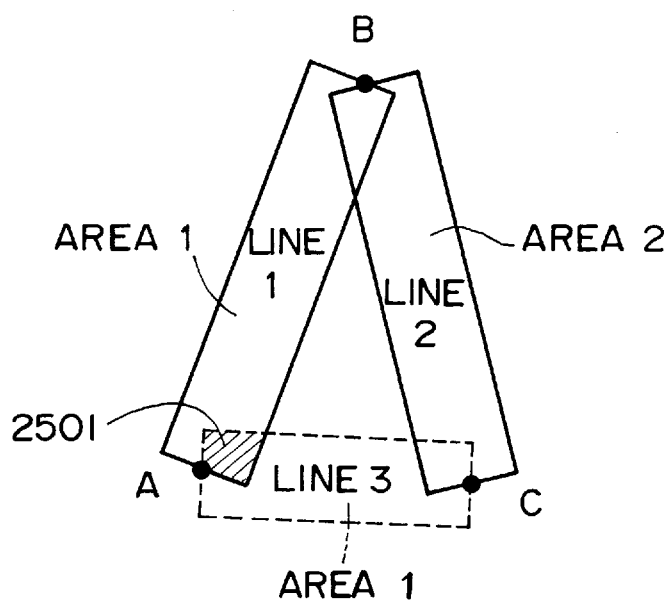
FIG. 18 shows portions to be rounded when the number of designated lines is odd.
Figure 19:
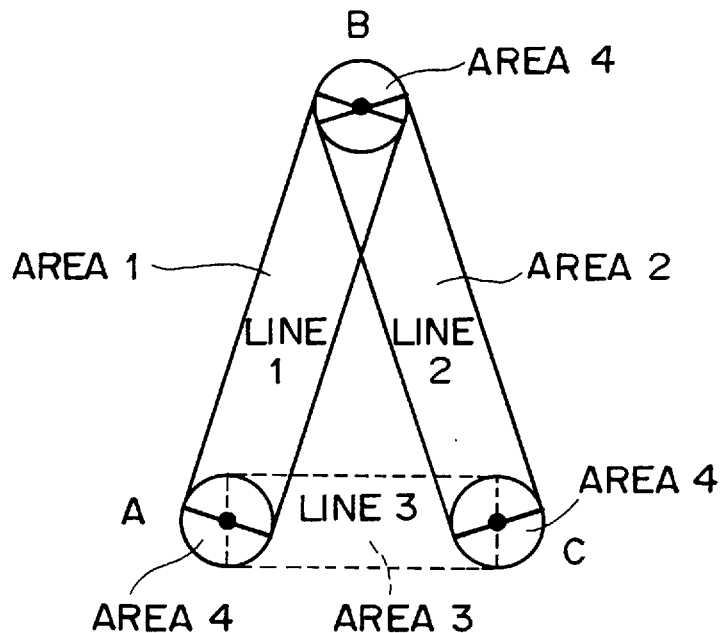
FIG. 19 shows the portions rounded in the condition shown in FIG. 18.

On the other hand, assume that the number n of the lines is odd. FIG. 18 shows a specific image in the form of a closed loop A–B–C–A having three lines. In this case, if a first area or box 1 containing the line A–B, a second area 2 containing the line B–C and a third area 1 containing the line C–A are assumed, then no area signals will appear for a region 2501 where the first and third boxes which are both the area "1" overlap each other. In light of this, as shown in FIG. 19, a first box containing the line A–B, the second box containing the line B–C and the third box containing the line C–A are assumed to be the areas 1, 2 and 3, respectively. In addition, circular regions where the boxes are connected are assumed to be areas 4. This allows an area signal to appear even for the overlapping regions.

Figure 20:
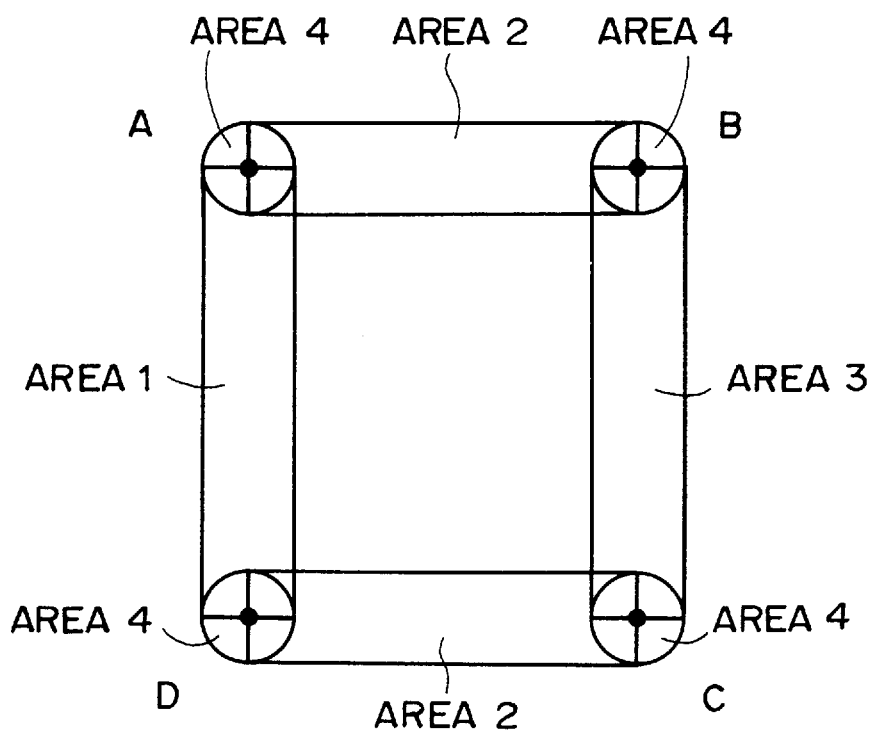
FIG. 20 shows rectangular areas to be generated when the number of designated lines is odd.

The above four areas 1–4 may also be applied to an image whose number n is even. Specifically, FIG. 20 shows a closed loop A–B–C–D–A whose number n is four. In this case, a box containing the line D–A, a box containing the line A–B, a box containing a line B–C and a box containing a line C–D are assumed to be areas 1, 2, 3 and 2, respectively. In addition, regions where the boxes are connected are assumed to be areas 4. This also allows an area signal to appear even for the overlapping regions.

Figure 21:
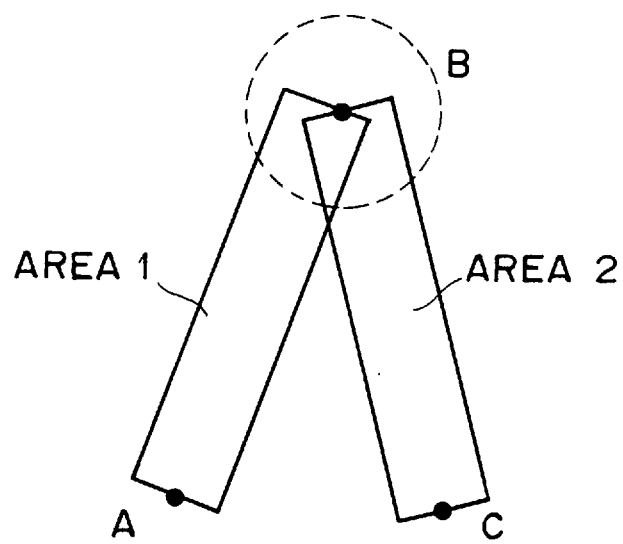
FIG. 21 shows a bent portion.
Figure 22:
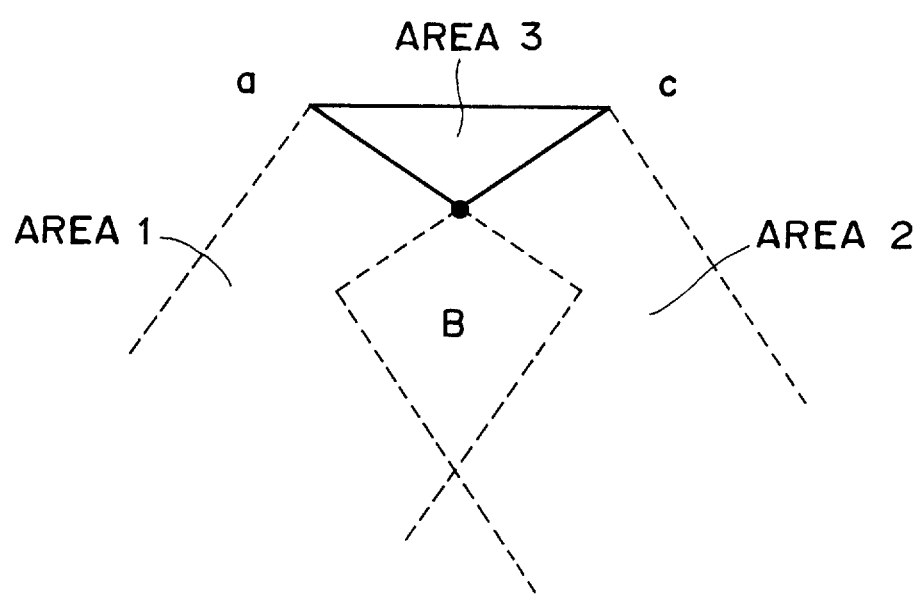
FIG. 22 shows a region included in the bent portion of FIG. 21 and to be cut flat.

A reference will be made to FIGS. 21–28 for describing a procedure for cutting bent portions flat. As shown in FIG. 21, assume that areas 1 and 2 are respectively assigned to a first box containing a line A–B and a second box containing a line B–C. Then, a recess appears in the portion where the two boxes are connected, as indicated by a phantom circle B. The recess B defined by the corner a of the area 1, the corner c of the area 2 and the point where the areas 1 and 2 intersect each other is assumed to be an area 3. An area signal can be generated for the area B by the previously stated procedure. Hereinafter will be described a procedure for generating an area signal for the area 3.

Figure 23:
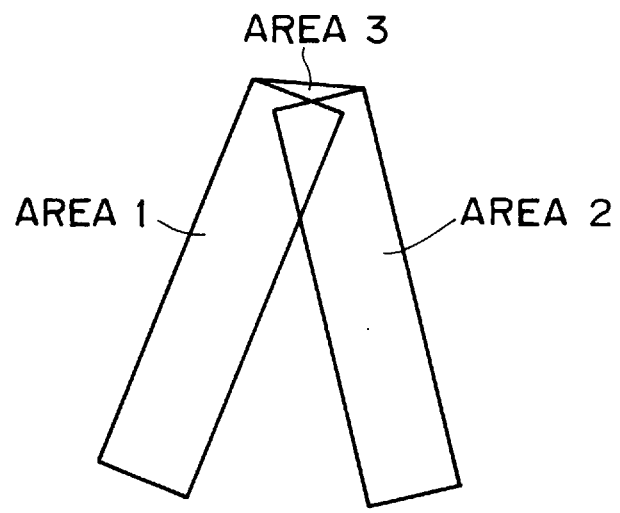
FIG. 23 shows a bold line with a bent point cut flat.
Figure 24:
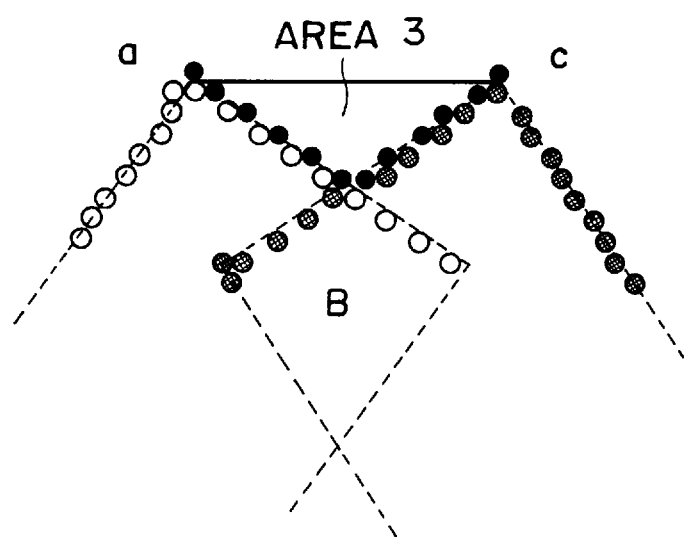
FIG. 24 shows contour data particular to the region shown in FIG. 22.

FIG. 24 is an enlarged view of an area 3 shown in FIG. 23 and portions of areas 1 and 2 adjoining it. As shown, as for the area 1, contour data (start and end points) represented by blank circles are written to a bit map memory. As for the area 2, contour data represented by mesh circles are written to the memory. Further, as for the area 3, contour data represented by black circles are written to the memory. Then, the contour lines are traced on the basis of the start and end data stored in the memory. The tracing begins at the point designated first.

Figure 25:
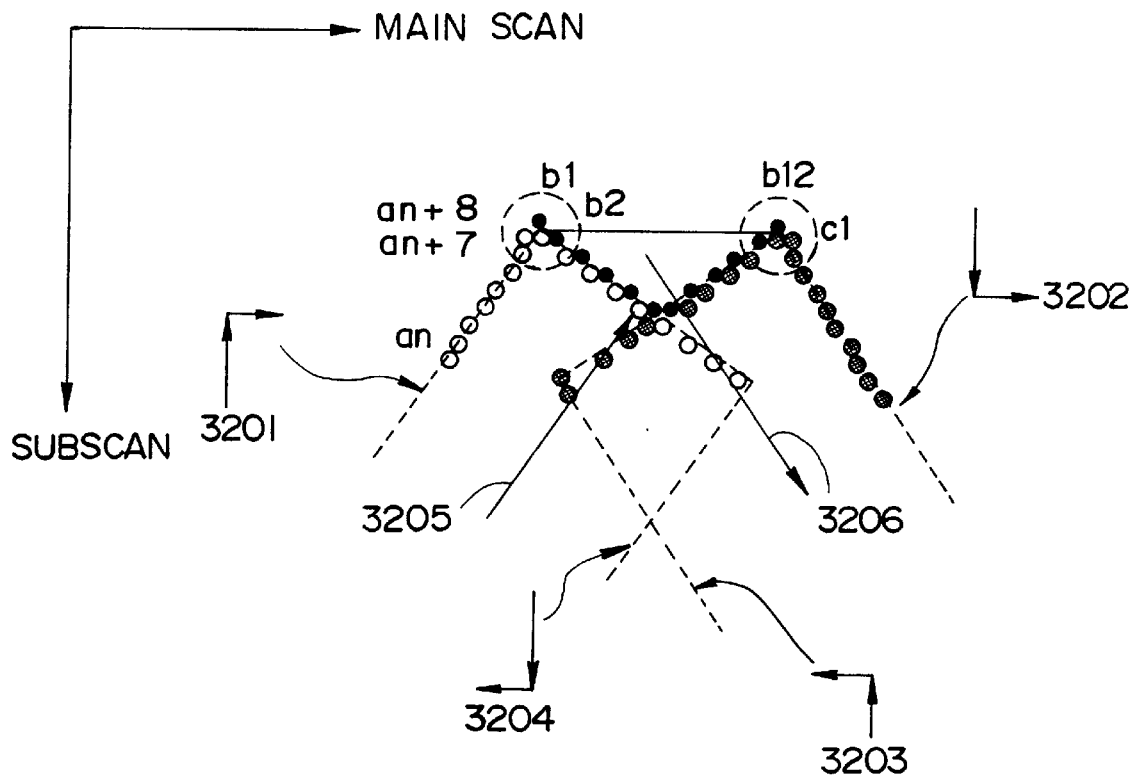
FIG. 25 demonstrates a method of tracing the contour data of FIG. 24.

As shown in FIG. 25, the direction of data search is varied in accordance with the direction 3205 or 3206 of the designated line (center line of the box) and the tracing direction. In FIG. 25, the direction of data search is varied as listed below:

arrow 3201: −1 in subscanning direction positive direction in main scanning direction arrow 3202: +1 in subscanning direction positive direction in main scanning direction arrow 3203: −1 in subscanning direction negative direction in main scanning direction arrow 3204: +1 in subscanning direction negative direction in main scanning direction Searching methods are classified, as follows. So long as tracing is effected in the same direction as the direction 3205 or 3206 of the line connecting the designated points, the same positive/negative main and subscanning directions and the same increment/decrement are maintained. In FIG. 25, the area 1 is traced from its point an to a point an+1 via intervening points an+1, . . . , an+7 (corner of the area 1). Then, the tracing is transferred from the point an+8 to a point b1 in the widthwise direction of the area 1. This is sequentially followed by points b1, b2, . . . , b12 (corner of area 2). Subsequently, the trancing is transferred from the point b12 to a point c1 included in the area 2. In this manner, the direction 3205 or 3206 of the line changes when the trancing is transferred from one area to the other area. However, as for a line connecting the start and end points, the direction of the line is varied on detecting such a line. Data resulting from the tracing are distinguished by the area number.

Figure 26:
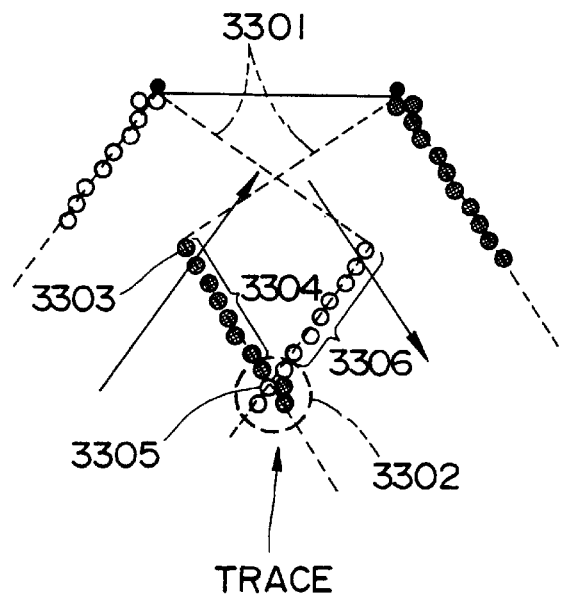
FIG. 26 shows a specific condition in which the tracing cannot be effected.
Figure 27:
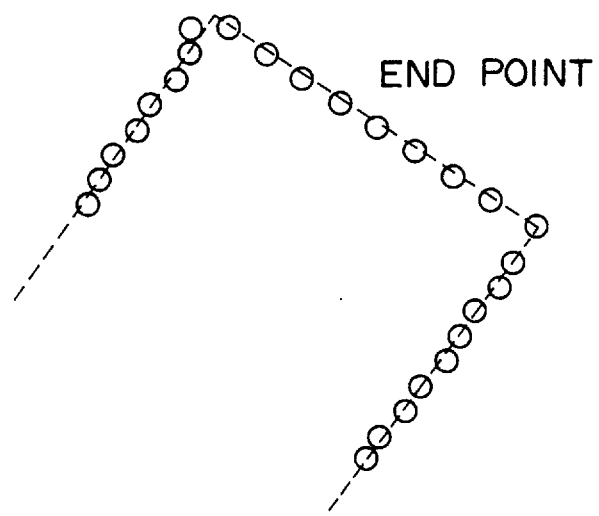
FIG. 27 shows specific end point data.
Figure 28A:
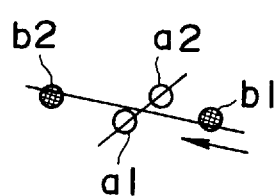
FIGS. 28A and 28B show the condition of FIG. 26 in detail.
Figure 28B:
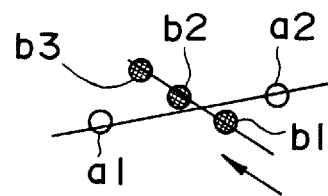

FIG. 26 shows a line 3301 representative of a recess and extending from, e.g., the point b2 next to the point b1 to the point b11, not shown, just before the point b12. The position data representative of such a recess are not written to the bit map memory. However, as shown in FIG. 27, position data including a start and an end point are written to the memory. At a portion 3302, FIG. 26, where the sides 3304 and 3306 of the two boxes intersect each other, the tracing cannot be effected, as will be described with reference to FIGS. 28A and 28B. In FIGS. 28A and 28B, points a1 and a2 and points b1, b2 and b3 are each representative of a different line; the points a1 and b1 are located at the same level, and so are the points a2 and b2. In accordance with the above searching method, the points b1, a2 and a1 shown in FIG. 28A can be traced in this order. However, in FIG. 28B, the tracing proceeds from the point b1 to the point b3 via the point b3 without being transferred to the point a1 or a2.

To solve the above problem, after the side 3304, FIG. 26, has been traced to its end 3303, it is traced back with the data being sequentially deleted. When the trace-back reaches the intersecting portion 3302, the data changes (data 3305). Then, the tracing is transferred to another side 3306 and continued while substituting uniform data. If desired, when the trace-back reaches the data 3305, the data of the side 3306 may be deleted by tracing the deleted portion. Further, in FIG. 26, assume that blank circles, black circles and mesh circles are respectively representative of the areas 1, 2 and 3. Then, an arrangement may be made such that the area processing is not executed with the areas 1 and 2, the area number after the tracing is changed to 3, the area processing is executed with the area with the area number 3, and the areas with the area numbers 1 and 2 are not processed.

The above tracing is repeated. Then, the area data of the area 4 are written to the memory on the basis of the areas 1, 2 and 4. In this case, the maximum area number max-2 is the maximum number of areas which can be used. On the other hand, when the data of the sides 3304 and 3306, FIG. 26, are deleted, the maximum number area number max is the maximum number of areas which can be used.

In summary, it will be seen that the present invention provides an image processing device having various unprecedented advantages, as enumerated below.

(1) A rectangular box is generated such that the start and end points of a line lie at the center in the widthwise direction of the box, and such that a bent point lies at a corner of the box on the basis of the direction of rotation of the above line and a line contiguous therewith. The bent point therefore does not lie at the center of the box in the widthwise direction. Consequently, when the contiguous two lines are bold and make an acute angle therebetween, the bent point is prevented from appearing unnatural in an image.

(2) An area for rendering the bent point smooth is generated. Then, the start and end points, in the main scanning direction, of a single area including the above area and adjoining rectangular areas are generated. Therefore, when an area signal is generated based on the stored start and end points of each area in the main scanning direction, a blank is obviated despite that the bent point area is additionally generated.

(3) The contour of the bent point area and those of the adjoining rectangular areas are traced to generate the start and end points, in the main scanning direction, of a single area including the above areas. This also achieves the above advantage (2).

(4) Points input on first inputting means lie on the contour lines of a shape having thickness. This prevents the shape of a connecting portion from forming an acute angle and therefore a line at a position far from the input points. The resulting line appears natural.

(5) When a line having thickness is drawn by area processing, a plurality of areas are combined to complete a single area. This makes it needless to determine the intersection of lines and thereby promotes easy processing.

(6) When a line having thickness is drawn by area processing, a plurality of areas are used for a moment. This obviates portions which cannot be subjected to area processing due to overlap. Therefore, the extra bent point area does not bring about any blank.

Various modifications will become possible for those skilled in the art after receiving the teachings of the present disclosure without departing from the scope thereof.

What is claimed is:

1. In an image processing device for drawing, when a start point, at least one bent point, an end point and a width of a bold line are input, the bold line by generating a plurality of rectangular areas based on a line connecting the start point and the bent point, a line connecting the bent point and the end point, and the width, means is provided for generating the plurality of rectangular areas such that in each of the rectangular areas the start and end points lie at a center in a widthwise direction of the rectangular area while the bend point lies at a corner on the basis of a direction of rotation of contiguous lines.

2. An image processing device for drawing, when a start point, at least one bent point, an end point and a width of a bold line are input, the bold line by generating a plurality of rectangular areas based on a line connecting the start point and the bent point, a line connecting the bent point and the end point, and the width, said device comprising:

position generating means for generating an area for rendering the bent point smooth, and then generating start points and end points, in a main scanning direction, of a single area including said area and rectangular areas contiguous with said area;

storing means for storing said start points and said end points; and area signal generating means for generating an area signal which is active between said start points and said end points stored in said storing means;

wherein the bold line is drawn while said area signal is active.

3. A device as claimed in claim 2, wherein said position generating means traces contour lines of said area for rendering the bent point smooth and contour lines of said rectangular areas.

4. An image processing device including reading means for photoelectrically reading an image of a document, and display means for displaying the image read by said reading means, and for outputting the image after subjecting the image to preselected processing, said device comprising:

first inputting means for inputting a start point, a bent point and an end point of a bold line to be drawn in the image as positions of the bold line;

first storing means for storing information representative of positions of the start point, the bent point, and the end point;

second inputting means for inputting information representative of a boldness of the line;

second storing means for storing the boldness of the line;

computing means for computing, based on said information stored in said first and second storing means, an area containing lines having boldness and connecting the start point, the bent point and the end point input on said first inputting means; and image processing means for processing the image lying in said areas.

5. A device as claimed in claim 4, wherein said computing means generates said area by combining a plurality of areas.

6. A device as claimed in claim 4, further comprising tracing means for tracing contours to thereby combine a plurality of areas into a single area.

* * * * *